(12) United States Patent
Chou et al.

(10) Patent No.: US 8,897,492 B2
(45) Date of Patent: Nov. 25, 2014

(54) PEOPLE COUNTER INCLUDING SETTING INTERFACE AND METHOD FOR SETTING THE SAME

(75) Inventors: Yeon Hag Chou, Seoul (KR); Jung Keun Ahn, Goyang-si (KR); Ben White, Surrey (GB); Etienne Eccles, Surrey (GB); Bin Cheng, Wuxi (CN); Geoffrey Thiel, Surrey (GB); Neil Robinson, Surrey (GB)

(73) Assignees: UDP Technology Ltd., Yeomchang-dong, Gangseo-gu, Seoul (KR); VCA Technology Ltd., Surbiton, Surrey (GB)

(*) Notice: Subject to any disclaimer, the term of this patent is extended or adjusted under 35 U.S.C. 154(b) by 0 days.

(21) Appl. No.: 13/522,903

(22) PCT Filed: Aug. 11, 2011

(86) PCT No.: PCT/KR2011/005884
§ 371 (c)(1),
(2), (4) Date: Jul. 18, 2012

(87) PCT Pub. No.: WO2012/176953
PCT Pub. Date: Dec. 27, 2012

(65) Prior Publication Data
US 2014/0119594 A1 May 1, 2014

(30) Foreign Application Priority Data
Jun. 23, 2011 (KR) .................. 10-2011-0061282

(51) Int. Cl.
*G06K 9/00* (2006.01)
*G06F 3/0484* (2013.01)
*G06F 17/00* (2006.01)
*G06Q 90/00* (2006.01)
*G07C 9/00* (2006.01)

(52) U.S. Cl.
CPC ........ *G06K 9/00369* (2013.01); *G06F 3/04847* (2013.01); *G06F 17/60* (2013.01); *G06Q 90/00* (2013.01); *G07C 9/00* (2013.01)

USPC .......................................... 382/103; 382/107

(58) Field of Classification Search
CPC ................. G06T 2207/30242; G06K 9/00778; G06K 9/00785
See application file for complete search history.

(56) References Cited

U.S. PATENT DOCUMENTS 7,176,441 B2 * 2/2007 Sumitomo et al. ............. 250/221
7,409,076 B2 * 8/2008 Brown et al. .................. 382/103
(Continued)

FOREIGN PATENT DOCUMENTS

JP 08-123935 5/1996
JP 2005-148863 6/2005
(Continued)

OTHER PUBLICATIONS

Velipasalar et al., "Automatic counting of interacting people by using a single uncalibrated camera," ICME 2006.*
(Continued)

*Primary Examiner* — Anand Bhatnagar
*Assistant Examiner* — Soo Park
(74) *Attorney, Agent, or Firm* — John K. Park; Park Law Firm

(57) ABSTRACT

Disclosed is a people counter including a setting interface and a setting method thereof. Since a reference width used to count of a moving object within an image is visibly arranged and displayed on a screen so that a detected width of the moving object can be compared with the reference width, setting and verification for count is very easy. In addition, since the interface can be freely moved for adjustment and comparison of a reference width using a pointing device such as a mouse, thereby providing verification and resetting which are intuitive and practical over conventional manual adjustment schemes, count accuracy can be easily increased in different environments depending on conditions or type of moving objects within an image.

14 Claims, 18 Drawing Sheets

(56) References Cited

U.S. PATENT DOCUMENTS

| | | | |
|---|---|---|---|
| 7,787,656 B2 * | 8/2010 | Chen | 382/103 |
| 8,107,676 B2 * | 1/2012 | Senior | 382/103 |
| 8,224,026 B2 * | 7/2012 | Golan et al. | 382/103 |
| 8,699,758 B2 * | 4/2014 | Almbladh | 382/107 |
| 2008/0252723 A1 * | 10/2008 | Park | 348/143 |
| 2009/0180583 A1 * | 7/2009 | Park et al. | 377/9 |
| 2010/0321504 A1 * | 12/2010 | Miyamaki et al. | 348/169 |

FOREIGN PATENT DOCUMENTS

| | | |
|---|---|---|
| JP | 2005148863 A * | 6/2005 |
| KR | 10-0327103 | 9/2002 |
| KR | 10-2009-0049332 | 5/2009 |
| KR | 10-2009-0078982 | 7/2009 |

OTHER PUBLICATIONS

Jo et al., "Pedestrian segmentation from uncalibrated monocular videos using a projection map", IEEE Signal Processing Letters 2009.*

Jaijing et al. "Object detection and modeling algorithm for automatic visual people counting system", ECTI-CON 2009.*

Chen et al. "People counting system for getting in/out of a bus based on video processing", ISDA 2008.*

Lee et al. "Automatic estimation of pedestrian flow", ISDSC 2007.*

* cited by examiner

PEOPLE COUNTER INCLUDING SETTING INTERFACE AND METHOD FOR SETTING THE SAME

CROSS-REFERENCE TO RELATED APPLICATION

This application claims the benefit of Korean Application No. 10-2011-0061282, filed on Jun. 23, 2011, with the Korean Intellectual Property Office, the disclosure of which is incorporated herein by reference.

TECHNICAL FIELD

This invention relation relates to a people counter including a setting interface and a method for setting the same, and more particularly to a people counter including a setting interface which includes components used to count an object moving from region to region in an image and allows a user to set, arrange and adjust the components on a screen on which the image is displayed, using a pointing device, thereby providing a visible and intuitive counter, and a method for setting the same.

BACKGROUND ART

A people counter refers to a device for counting the number of persons unidirectionally or bidirectionally using an infrared beam process or a thermal image process.

In some cases, the people counter may be used to count occupancy and transit time in a particular place.

With recent advance of image analysis technologies, a technique for identifying and monitoring a moving object in an image has been widely applied to control system.

In addition, there is an increasing attempt to apply such a moving object identifying and monitoring technique to people counters.

FIG. 1 is a view showing an existing moving object identification system for detection of a moving object. This existing moving object identification system can determine whether objects 11 and 13 moving in a space 10 are people 12 or not 14 by identifying the objects and monitoring their moving path or detecting their shape through a camera 100.

However, such an existing moving object identification system has to store three dimensional information for the space and feature information of the moving objects for identification and monitoring of the moving objects and requires customization for a space in which the system is installed, which makes it difficult to apply the system to a general-purpose people counter.

In order to overcome the above disadvantage and facilitate the application of the moving object identification technique to the people counter, an approach has been recently employed, which sets a virtual line in a particular position within an image, monitors movement of a moving object and performs a counting operation when the moving object crosses the set virtual line.

FIG. 2 is a view showing an existing count system for count of a moving object, in which a counting operation is performed when the moving object or a person in the image crosses a virtual line 25 set by a user on a screen 20 on which the image is displayed.

However, such a count system also requires adjustment for count depending on how to analyze an image for identification of the person or the moving object in the image.

For example, if there is a case where a single person 21 and 22 crosses the virtual line 25 and another case where two or more persons cross the virtual line 25, setting and adjustment for easy distinction therebetween and correct count are required.

However, such an existing count system provides only a manual setting to cause troublesome setting and adjustment, which is not fit for the nature of a count system requiring easy setting depending on the position and angle of a camera and the type of a moving object to be counted in an image.

That is, such an existing count system has a disadvantage in that different calculation values matching different environments have to be manually set, persistently modified and correctly applied for actual use in order to decrease count inaccuracy which may be produced due to different environmental characteristics of the image. This imposes a big burden on a manager who manages the system, and makes it difficult for common users to use the system, which results in difficulty in generalization of the count system, low reliability for accuracy of the system, and difficult verification of the system.

DISCLOSURE

Technical Problem

To overcome the above problems, it is therefore an object of the present invention to provide a people counter including a setting interface in which a reference width used to count of a moving object within an image is visibly arranged and displayed on a screen so that a detected width of the moving object can be compared with the reference width, and a setting method thereof.

It is another object of the present invention to provide a people counter including a setting interface which can be freely moved for adjustment and comparison of a reference width using a pointing device such as a mouse, thereby providing verification and resetting which are intuitive and practical over conventional manual adjustment schemes, a setting method thereof.

It is still another object of the present invention to provide a people counter including a setting interface in which settings can be optimally adjusted while confirming detection reliability intuitively by indicating a real time object measurement size close to a set value, a setting method thereof.

Technical Solution

To achieve the above objects, according to an aspect, the present invention provides a people counter for counting a moving object moving from region to region within an image received from a camera through an image analysis system, including: a setting interface which provides a screen on which the image is displayed and allows a user to select one or more preset visible components for count of the moving object and superimpose the selected visible component on the image in a drag & drop manner using a point device in order to set and manipulate the visible component; a line setting unit which provides a moving object crossing boundary line as one of the visible components; a reference width setting unit which provides a reference width for indication of a reference of a width of the moving object crossing the line, as one of the visible components; and a count unit which detects the width of the moving object crossing the line in the received image through a preset image analysis system and counts the moving object based on the reference width by means of a preset counting scheme.

Preferably, the setting interface indicates the width of the detected moving object accumulatively in count of the moving object in such a manner that a new detected content is indicated in a region adjacent to the reference width while already-detected contents are ousted and more than a preset number of already-detected contents disappear.

Preferably, when the width of the detected moving object is indicated, the setting interface indicates a plurality of blanks to differentiate between widths of a plurality of detected moving objects depending on the number of moving objects determined when the plurality of moving objects is counted.

Preferably, the reference width setting unit provides a graphics user interface which displays the reference width located on the line and allows a user to make a real time manipulation for the reference width using the pointing device.

Preferably, the reference width setting unit sets the reference width with two bars indicated in both directions on the line so that the user can use the pointing device to adjust the reference width symmetrically and simultaneously with respect to a middle point between the two bars.

Preferably, the reference width setting unit provides a reference width consisting of a first reference width used to count one moving object, a second reference width which is set to be smaller than the first reference width and does not count the moving object, and a third reference width which is set to be larger than the first reference width and counts one or more moving objects, all of which are simultaneously adjusted according to a predetermined rule when the first reference width is adjusted.

Preferably, if the width of the detected moving object is located to correspond to one of the first reference width, the second reference width and the third reference width, the setting interface indicates the width of the detected moving object at a position corresponding to the set reference width with one or more distinct colors according to a predetermined indication rule.

Preferably, the setting interface provides an interface which allows movement and adjustment of the reference width in a drag and drop manner.

Preferably, the people counter further includes a count setting unit 250 which provides a counter, as one of the visible components, which is arranged in one region differentiated by the line and indicates count for a moving object moving between the one region and the other region.

Preferably, the count unit performs a counting operation through an image analysis system to detect width of adjacent pixels which is changed within a predetermined range of the line.

Preferably, the pointing device is a mouse.

To achieve the above objects, according to another aspect, the present invention provides a setting method of a people counter for counting a moving object moving from region to region within an image received from a camera through an image analysis system, including the steps of: a) providing a screen on which the image is displayed; b) providing an interface which allows a user to select one or more preset visible components for count of the moving object and superimpose the selected visible component on the image in a drag & drop manner using a point device in order to set and manipulate the visible component; c) providing a moving object crossing boundary line as one of the visible components and displaying the provided line on the screen; d) providing a reference width for indication of a reference of a width of the moving object crossing the line, as one of the visible components; and e) detecting the width of the moving object crossing the line in the received image through a preset image analysis system and counting the moving object based on the reference width by means of a preset counting scheme.

Preferably, the setting method further includes a step of f) indicating the width of the detected moving object accumulatively in count of the moving object in such a manner that a new detected content is indicated in a region adjacent to the reference width while already-detected contents are ousted and more than a preset number of already-detected contents disappear.

Preferably, the step f) includes indicating a plurality of blanks to differentiate between widths of a plurality of detected moving objects depending on the number of moving objects determined when the plurality of moving objects is counted.

Preferably, the step f) includes indicating a reference width consisting of a first reference width used to count one moving object, a second reference width which is set to be smaller than the first reference width and does not count the moving object, and a third reference width which is set to be larger than the first reference width and counts one or more moving objects, all of which are simultaneously adjusted according to a predetermined rule when the first reference width is adjusted.

Preferably, the step f) includes, if the width of the detected moving object is located to correspond to one of the first reference width, the second reference width and the third reference width, indicating the width of the detected moving object at a position corresponding to the set reference width with one or more distinct colors according to a predetermined indication rule.

Preferably, the step d) include setting the reference width with two bars indicated in both directions on the line so that the user can use the pointing device to adjust the reference width symmetrically and simultaneously with respect to a middle point between the two bars.

Preferably, the step b) includes providing an interface which allows movement and adjustment of the reference width using the pointing device in a drag and drop manner.

Preferably, the setting method further includes a step of g) providing a counter, as one of the visible components, which is arranged in one region differentiated by the line and indicates count for a moving object moving between the one region and the other region, and displaying the counter on the screen.

Advantageous Effects

According to the present invention, in the people counter including a setting interface and the setting method thereof, since a reference width used to count of a moving object within an image is visibly arranged and displayed on a screen so that a detected width of the moving object can be compared with the reference width, setting and verification for count is very easy.

In addition, in the people counter including a setting interface and the setting method thereof, since the interface can be freely moved for adjustment and comparison of a reference width using a pointing device such as a mouse, thereby providing verification and resetting which are intuitive and practical over conventional manual adjustment schemes, count accuracy can be easily increased in different environments depending on conditions or type of moving objects within an image.

Furthermore, in the people counter including a setting interface and the setting method thereof, since settings can be optimally adjusted while confirming detection reliability intuitively by indicating a real time object measurement size close to a set value, setting and verification of the counter depending on the type of moving objects can be more easily achieved.

MODE FOR INVENTION

Hereinafter, preferred embodiments of the present invention will be described in detail with reference to the accompanying drawings.

Figure 1:
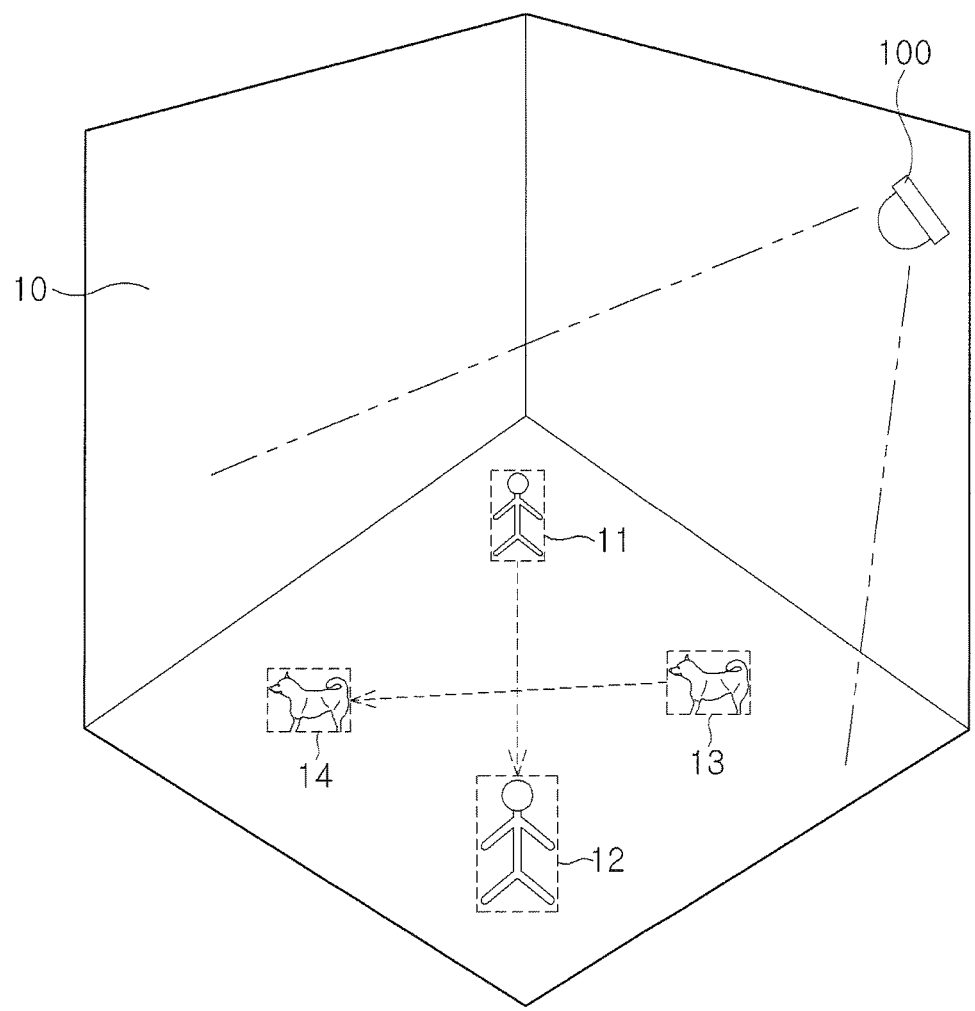
FIG. 1 is a view showing an existing moving object identification system for detection of a moving object.
Figure 2:
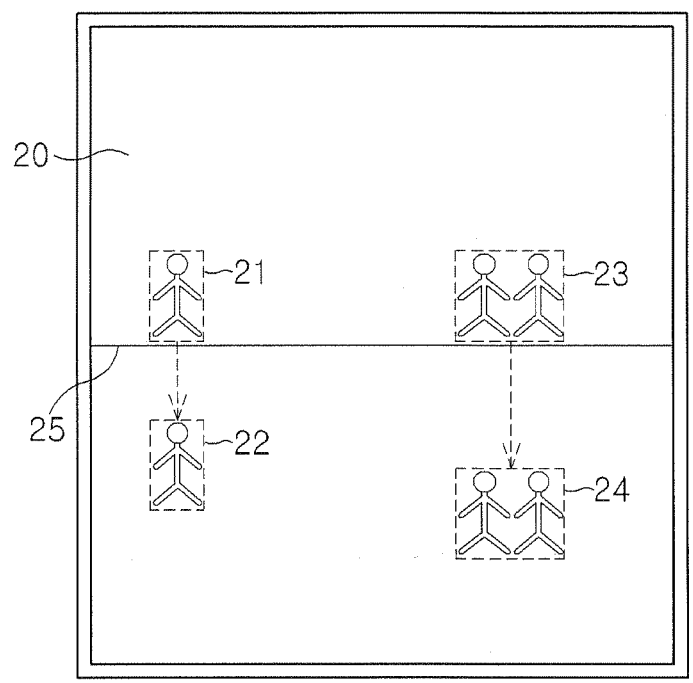
FIG. 2 is a view showing an existing count system for count of a moving object.
Figure 3:
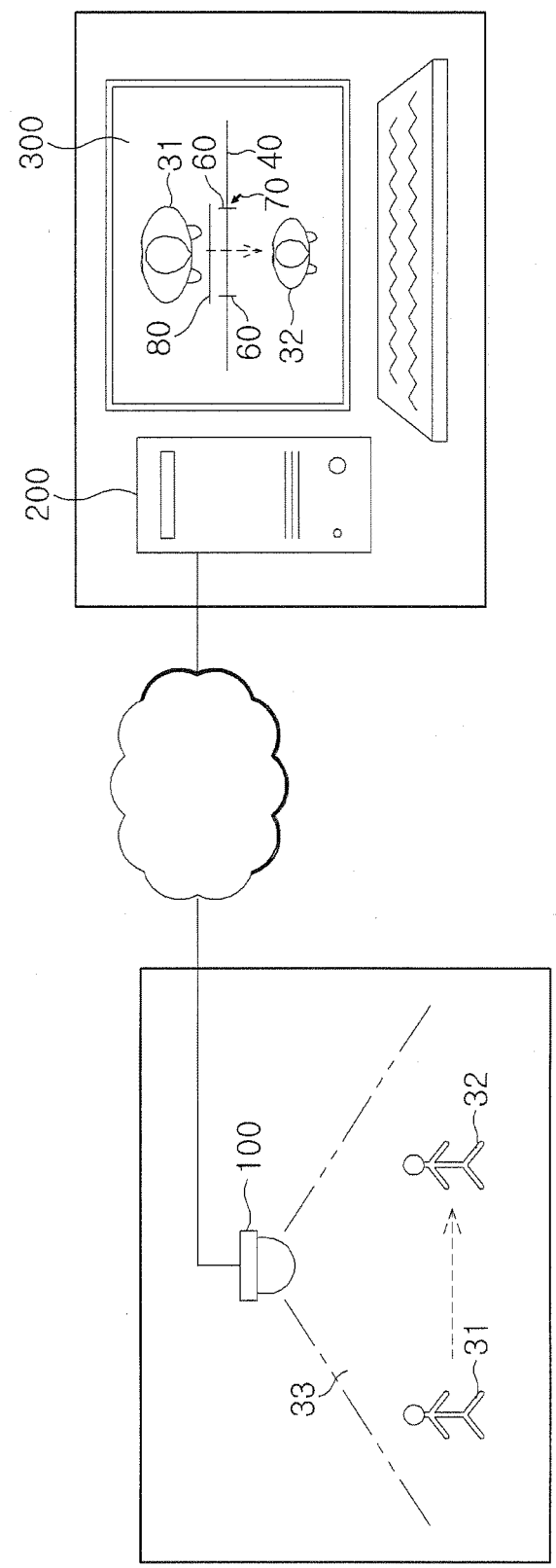
FIG. 3 is a view showing an example people counter including a setting interface according to an embodiment of the present invention.

FIG. 3 is a view showing an example people counter including a setting interface according to an embodiment of the present invention.

Referring to FIG. 3, a people counter 200 receives an image from a camera and counts a moving object 31 and 32 moving in a particular region 33 within the image through an image analysis.

The people counter 200 provides a screen 300 on which the image is displayed and further provides an interface which includes one or more visible components 40 and 60 for count of the moving object 31 and 32 on the screen 300 and allows a user to superimpose the components 40 and 60 on the image using a pointing device 70 for setting and operation.

The people counter 200 provides a line 40 placed on a region of the screen 300, as one of the visible components 40 and 60.

In addition, the people counter 200 provide a reference width 60 for indicating a reference for a width of the moving objects (to be counted) 21 and 32 crossing the line 40, as another of the visible components 40 and 60.

Then, the people counter 200 detects a width 80 of the moving object 31 and 32 crossing the line 40 in the received image through a predetermined image analysis system and counts the moving object based on the reference width 80 using a predetermined count scheme.

Existing people counters provide only a line for count and have to be manually set according to a predetermined image analysis system.

Therefore, the existing people counters has to be manually set in detail according to an event rule scheme depending on the type of moving objected to be recognized and the position and environment of a camera, which may be difficult to be achieved.

In addition, the existing people counters employ a numerical input system for detailed environment setting and fine adjustment in order to increase a count precision depending on a counting scheme of the image analysis, which is so troublesome and non-intuitive to need an experienced manager. Moreover, these people counters have low reliability because of difficulty in verification of the setting.

However, the people counter 200 of this embodiment can provide very simple fine adjustment and setting by setting the reference width 60 for direct count on the real image screen by means of the image pointing device 70 and providing an interface to allow the user to move and manipulate the reference width 60 with ease.

Such very simple fine adjustment and setting results from visible setting of the unit for correct counting through comparison of the width 80 of the randomly displayed moving object 31 and 32 with the reference width 60. Thus, the people counter 200 of this embodiment can have a wide range of application with no restriction on the type of the moving object 31 and 32 to be counted and environmental characteristics.

In other words, the people counter 200 of this embodiment provides an interface to allow a user to perform a verifying operation and adjust a filter so that subjects (moving objects) can be filtered to ignore the subjects or allow a user to set and adjust a reference width used to detect the number of moving objects using the pointing device 70, which results in easy visible detection in an analysis mode and hence maximized convenience of manipulation and fine adjustment.

In the meantime, an image analysis system applied to the people counter 200 may perform a counting operation based on general object detection and tracking; however, it is preferable that the image analysis system performs the counting operation based on detection of width of adjacent pixels which is changed within a predetermined range of the line 40.

In addition, it is relatively preferable that the camera 100 is perpendicular to the moving object 31 and 32 for smooth counting. However, a deviation from the perpendicularity within a predetermined angular range has an insignificant effect on precision of count.

An example of the pointing device 70 may include a mouse.

Note that the people counter 200 of this embodiment can perform the counting operation in both directions of the line 40.

In this way, in the people counter 200 including the setting interface according to this embodiment, the reference width 60 used to count the moving object in the image is visibly arranged and displayed on the screen 30 and the detection width 80 of the moving object 31 and 32 is compared with the reference width 60, thereby providing a very convenient setting for count.

A setting method of the people counter 200 of this embodiment will be now described in more detail with reference to FIGS. 4 to 7.

Figure 4:
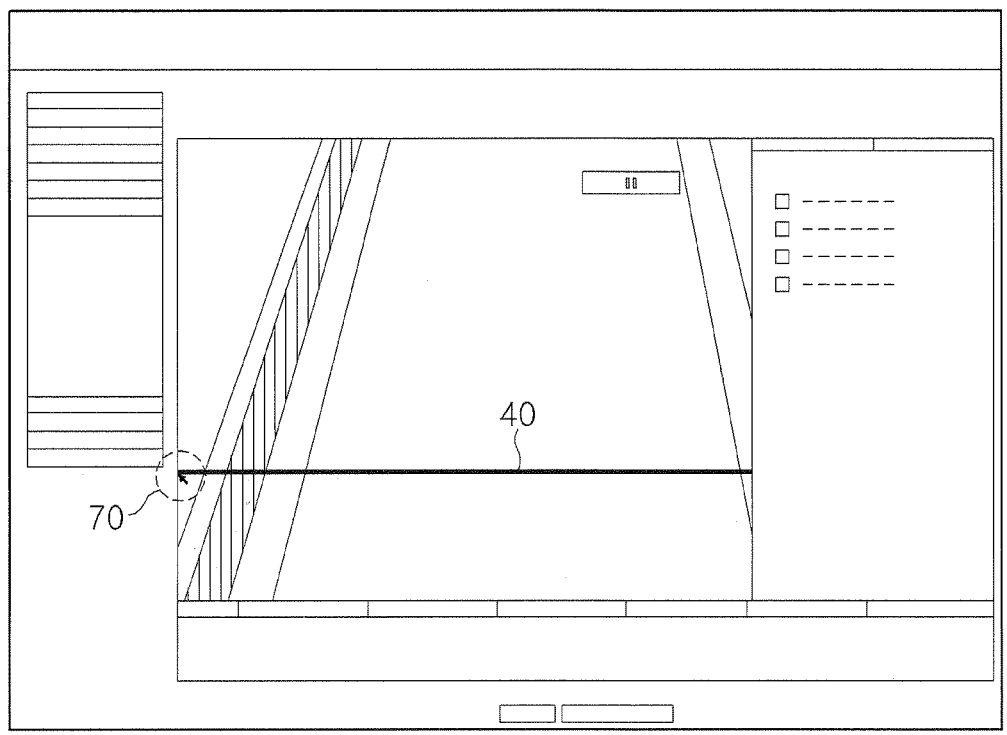
FIG. 4 is a view showing an example of line arrangement and setting according to an embodiment of the present invention.

FIG. 4 is a view showing an example of line arrangement and setting of the people counter on a screen.

Referring to FIG. 4, the people counter 200 provides a setting interface to allow a user to select a screen on which an image displayed and one of visible components which can be superimposed on the selected screen.

The user uses the mouse 70 to select a line component 40 in the setting interface and arrange the line component 40 at a selected appropriate position for count in the image.

At this time, arrangement and movement of the line component 40 and adjustment of the size thereof can be easily performed with the mouse 70.

Figure 5:
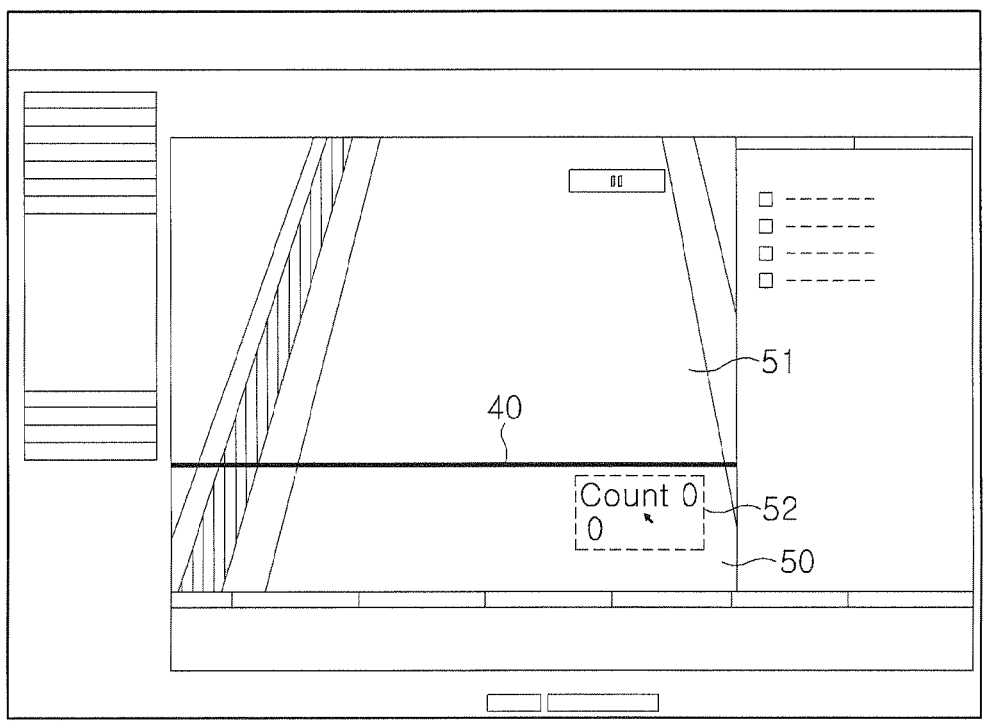
FIG. 5 is a view showing an example of counter arrangement and setting according to an embodiment of the present invention.

FIG. 5 is a view showing an example of counter arrangement and setting according to an embodiment of the present invention.

Referring to FIG. 5, after arranging the line component 40, the user selects a counter 50, which is one of the visible components, in the interface, and arranges the selected counter 50 in one 52 of the regions 51 and 52 divided by the arranged line component 40.

At this time, a movement direction of the counter 50, i.e., a direction to be counted, may be designated. In this embodiment, this direction is set to indicate the number of moving objects moving from the bottom 52 to the top 51 of the line component.

In addition, the user may arrange an additional counter in the other component, thereby counting the number of moving objects in both directions simultaneously.

Figure 6:
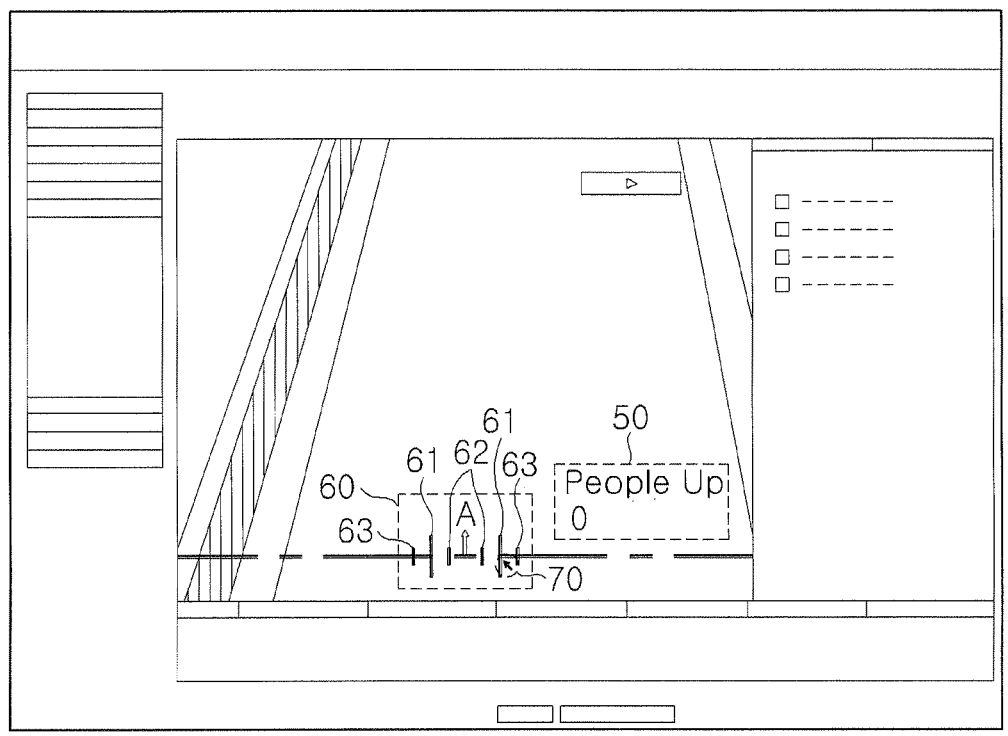
FIG. 6 is a view showing an example of reference width setting according to an embodiment of the present invention.

FIG. 6 is a view showing an example of reference width setting according to an embodiment of the present invention and FIG. 7 is a view showing an example of reference width adjustment according to an embodiment of the present invention.

Referring to FIG. 6, the reference width 60 is set to recognize a moving object within the image on the screen as a subject to be counted. Although it is shown in this embodiment that the reference width 60 is located on the line, the reference width 60 may be visibly provided to be separated from the line.

When the moving object crosses the line on the screen, the counter 50 is incremented if the detection width 80 of the moving object exceeds the reference width 60.

The reference width 60 is set and adjusted using the pointing device 70.

In some preferred embodiments, the reference width 60 is set with two bars 61 indicated in both directions on the line and the user uses the pointing device 70 to adjust the reference width 60 symmetrically and simultaneously with respect to a middle point between the two bars 61.

In addition, as shown, in the people counter of this embodiment, the reference width 60 may consist of a first reference width 61 used to count one moving object, a second reference width 62 which is set to be smaller than the first reference width 61 and does not count the moving object, and a third reference width 63 which is set to be larger than the first reference width 61 and counts one or more moving objects, all of which are simultaneously adjusted according to a predetermined rule when the first reference width 61 is adjusted. However, only the first reference width 61, may be visibly provided.

Figure 7A:
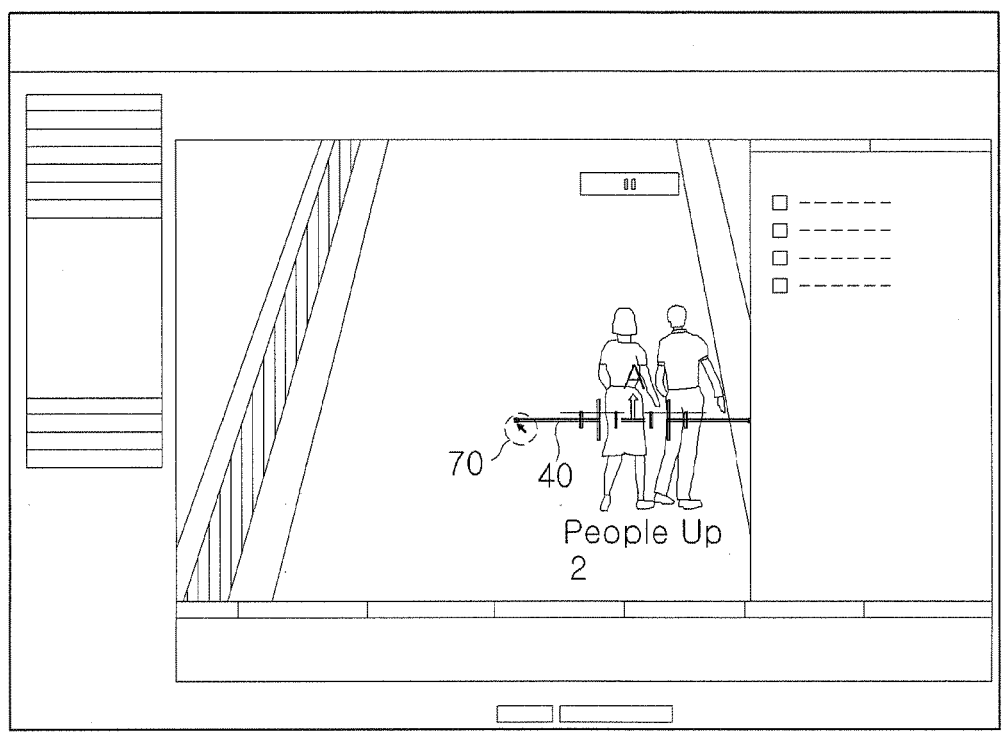
FIG. 7 is a view showing an example of reference width adjustment according to an embodiment of the present invention.
Figure 7B:
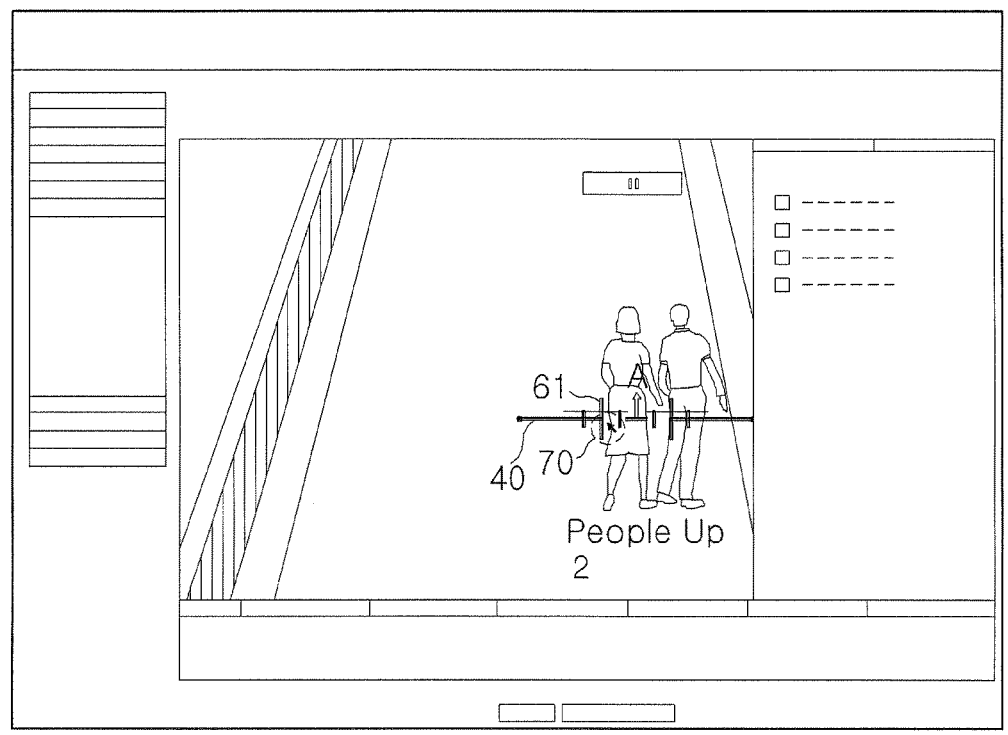

FIGS. 7a and 7b show another preferred embodiment of the reference width adjustment for the moving object(s) to be counted.

Referring to FIGS. 7a and 7b, a reference width on the line 40 is moved and adjusted by the pointing device 70 and may be dragged and dropped.

Upon finding a person who is moving in the image, the user changes from the current screen to a still frame at an appropriate time, moves the line 40 and the reference width indicated on the line, and adjusts the first reference width 61 in comparison with the width of the moving object.

When the first reference width 61 is adjusted, the second reference width and the third reference width are also simultaneously adjusted.

Figure 7C:
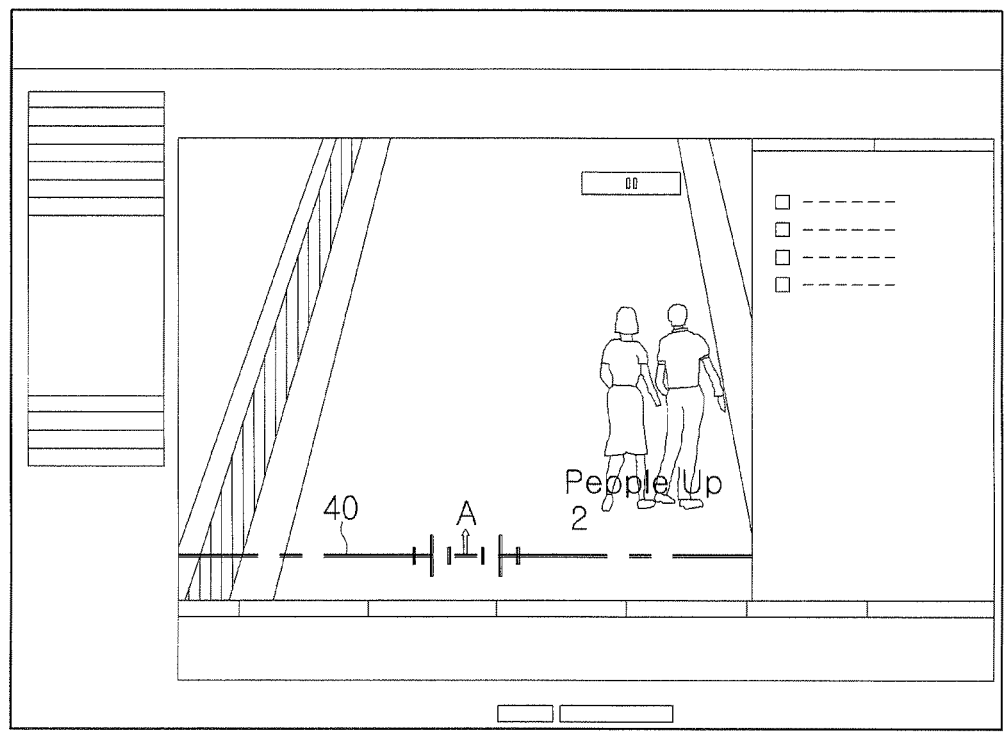

Thereafter, as shown in FIG. 7c, the user uses the pointing device to return the reference width 60 to its original position.

Figure 7D:
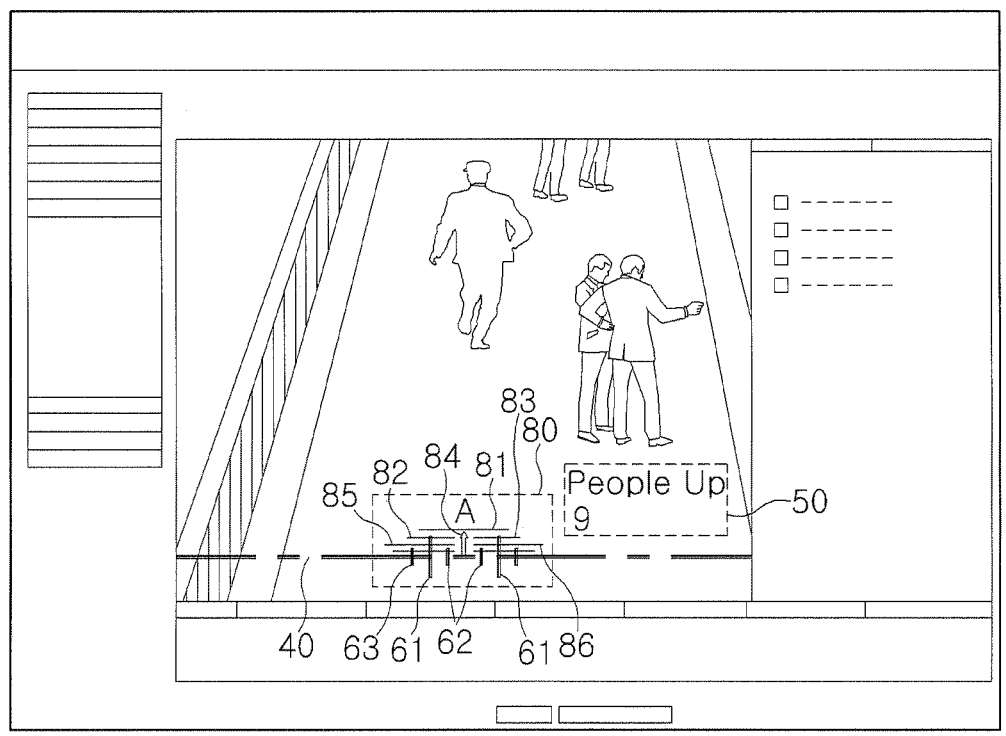

FIG. 7d shows the screen applied for actual count after the adjustment, in which the counter 50 for a moving person (moving object) is incremented.

At this time, upon counting the moving object, it is preferable that the people counter accumulates and indicates 80 a width 81 of a detected moving object on the above reference width.

In a preferred embodiment in which the width of the detected moving object is indicated, if the width of the detected moving object is located to correspond to one of the first reference width 61, the second reference width 62 and the third reference width 63, the width of the detected moving object may be indicated with one or more distinct colors according to a predetermined indication rule.

In another preferred embodiment in which the width of the detected moving object is indicated, if a plurality of moving objects is counted, the width of the detected moving object may be indicated 82, 83, 85 and 86 with the moving objects distinguished by blanks 84.

In this case, the entire indicated length is equal to the sum of detection widths of the plurality of moving objects.

This allows the user to easily readjust the width of the width 80 of the moving object to an appropriate reference width in visible comparison of the width 80 of the moving width with the reference width 61, 62 and 63 set by the user.

In other words, the user can count various moving objects easily by adjusting the width of the moving objects using the pointing device in visible comparison of the width of the moving objects with the reference width without a troublesome procedure to input or set a variety of environmental information after installing the people counter.

In this way, the people counter including the setting interface according to this embodiment provides an interface which can be freely moved for adjustment and comparison of the reference width using the pointing device such as the mouse, thereby providing verification and resetting which are intuitive and practical over the conventional manual adjustment schemes, which results in improvement of count precision in various environments depending on conditions or type of moving objects within an image.

FIG. 8 is a view showing an example count based on a reference width according to an embodiment of the present invention.

Figure 8A:
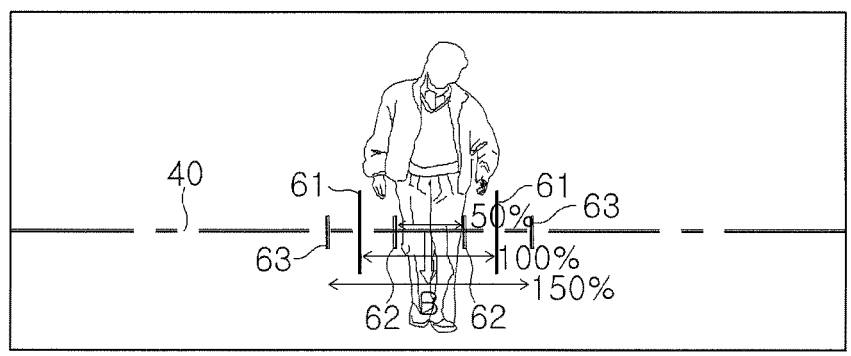
FIG. 8 is a view showing an example count based on reference width according to an embodiment of the present invention.

Referring to FIG. 8a, the people counter may differentiate the reference widths 61, 62 and 63 arranged on the line 40.

For example, the moving object can be counted with the second reference width 62 set to 50% of the first reference width 61 and the third reference width 63 set to 150% of the first reference width 61.

Figure 8B:
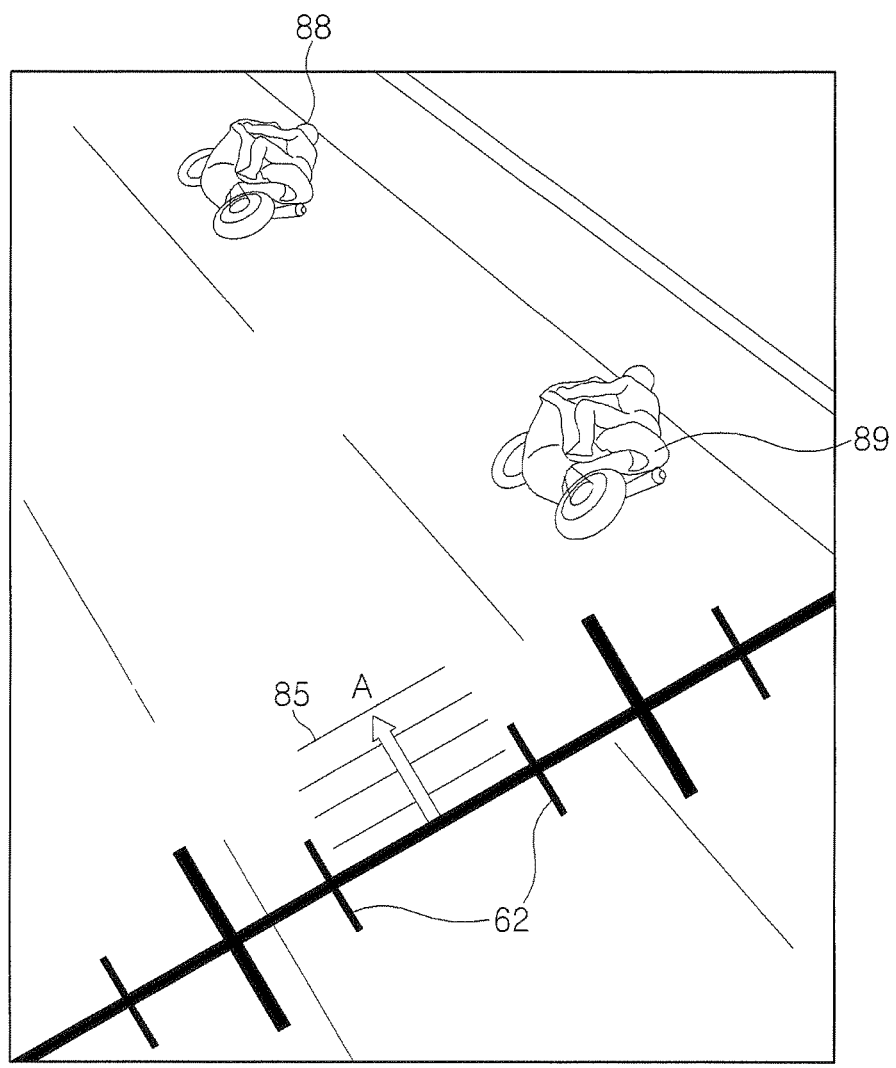
Figure 8C:
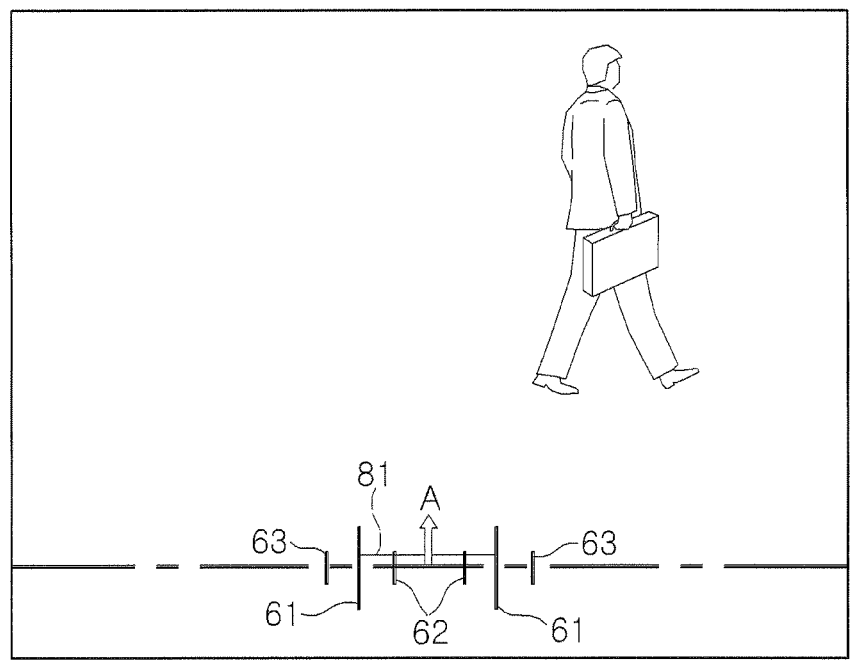
Figure 8D:
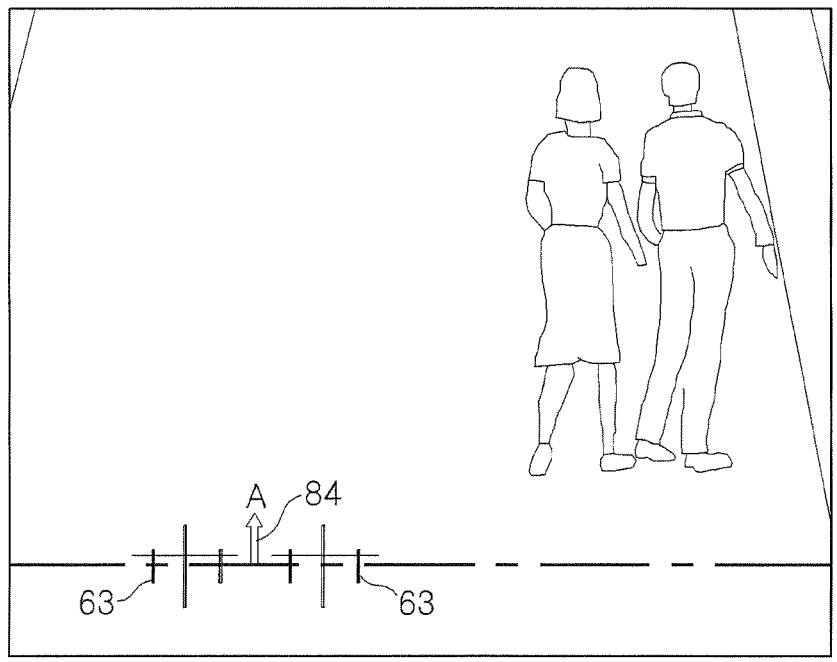

In other words, as shown in FIG. 8b, if a width of a moving object is smaller than the second reference width 62 (i.e., 50% of the first reference width), the moving object is excluded from count. As shown in FIG. 8c, if a width of a moving object is larger than the second reference width 62 and smaller than the third reference width 63 (i.e., between 50% and 150% of the first reference width), the moving object is counted. As shown in FIG. 8d, if a width of a moving object is larger than the third reference width 63 (i.e., 150% of the first reference width), one or more moving objects are counted in comparison of a recognized percentage according to a predetermined rule.

It is here noted that the second reference width and the third reference width may be automatically preset to certain percentage or size of the first reference width and may be automatically adjusted at the same time of adjustment of the first reference width, not separately, on the screen.

In addition, as described above, the first reference width, the second reference width and the third reference width are indicated in the center of the line and, when recognized moving objects are counted, widths of the moving objects may be indicated with different colors or with blanks therebetween, thereby providing a better visible comparison.

For example, if a recognized moving object 88 and 89 having no event crosses the line as shown in FIG. 8b, a width of the moving object 88 and 89 is indicated 85 in black on the reference width 62. If a single moving object is recognized, the moving object is indicated in white as shown in FIG. 8c. If a plurality of moving objects is recognized as shown in FIG. 8d, a blank 84 may be indicated in the center of the width.

In addition, it is preferable that the width of the recognized moving object is indicated on the predetermined reference width so that the former can be easily compared with the reference width and, in particular, the former is accumulatively indicated on the reference width for easier visible comparison irrespective of movement position of the moving object within the image.

This allows the user to intuitively adjust the reference width using the pointing device while watching the image.

In this way, the people counter including the setting interface according to this embodiment indicates one or more distinct gradations of each of the reference width (the first reference width, the second reference width and the third reference width) and adjusts the gradations simultaneously according to the predetermined rule so that width of a plurality of moving objects simultaneously detected in the image can be correctly counted without being separately set, thereby further facilitating setting of the counter depending on the type of the moving objects.

That is, the settings can be optimally adjusted while confirming detection reliability intuitively by indicating a real time object measurement size close to a set value, thereby further facilitating setting and verification of the counter depending on the type of the moving objects.

Figure 9:
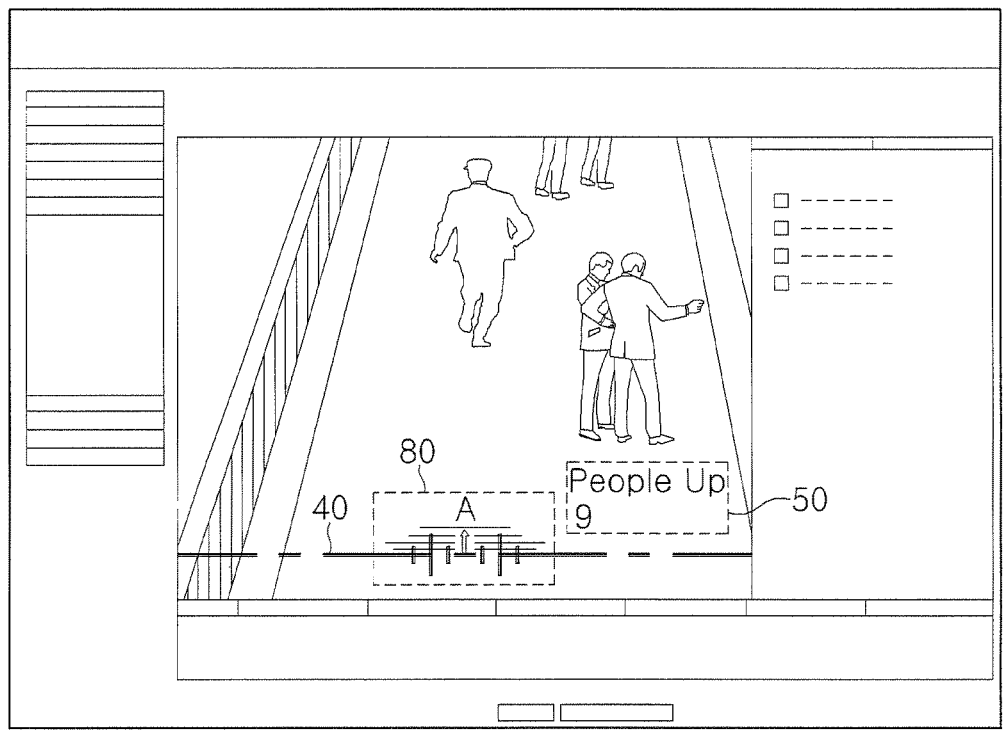
FIG. 9 is a view showing a first operation of a people counter according to an embodiment of the present invention.
Figure 10:
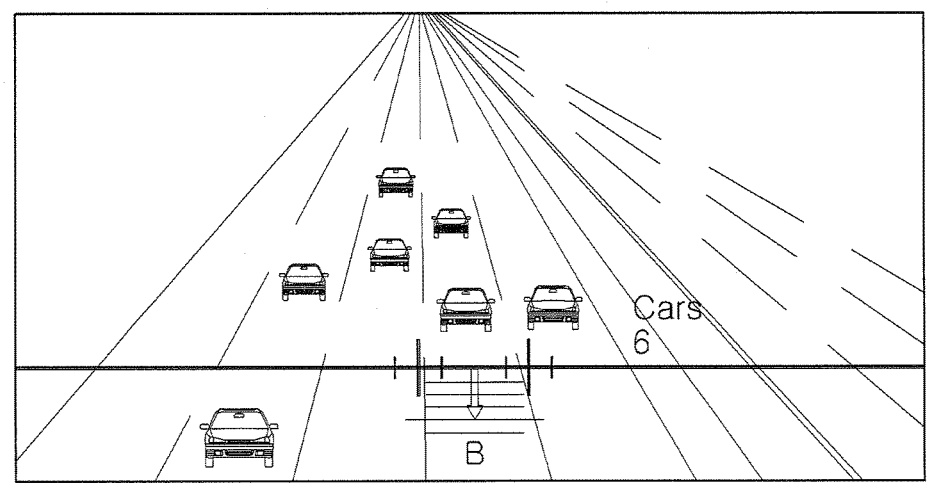
FIG. 10 is a view showing a second operation of the people counter according to an embodiment of the present invention.

FIGS. 9 and 10 are views showing first and second operations of the people counter, respectively, according to an embodiment of the present invention.

As shown in FIGS. 9 and 10, the people counter can simply set, adjust and modify the line 40 on an image provided from a camera using the pointing device, without requiring any means other than the camera, and then conveniently adjust 80 a reference width to a width of a corresponding moving object in visible comparison of widths of moving objects in the image using the pointing device, which allows a wide range of application of counting irrespective of the type of moving objects to be counted.

Figure 11:
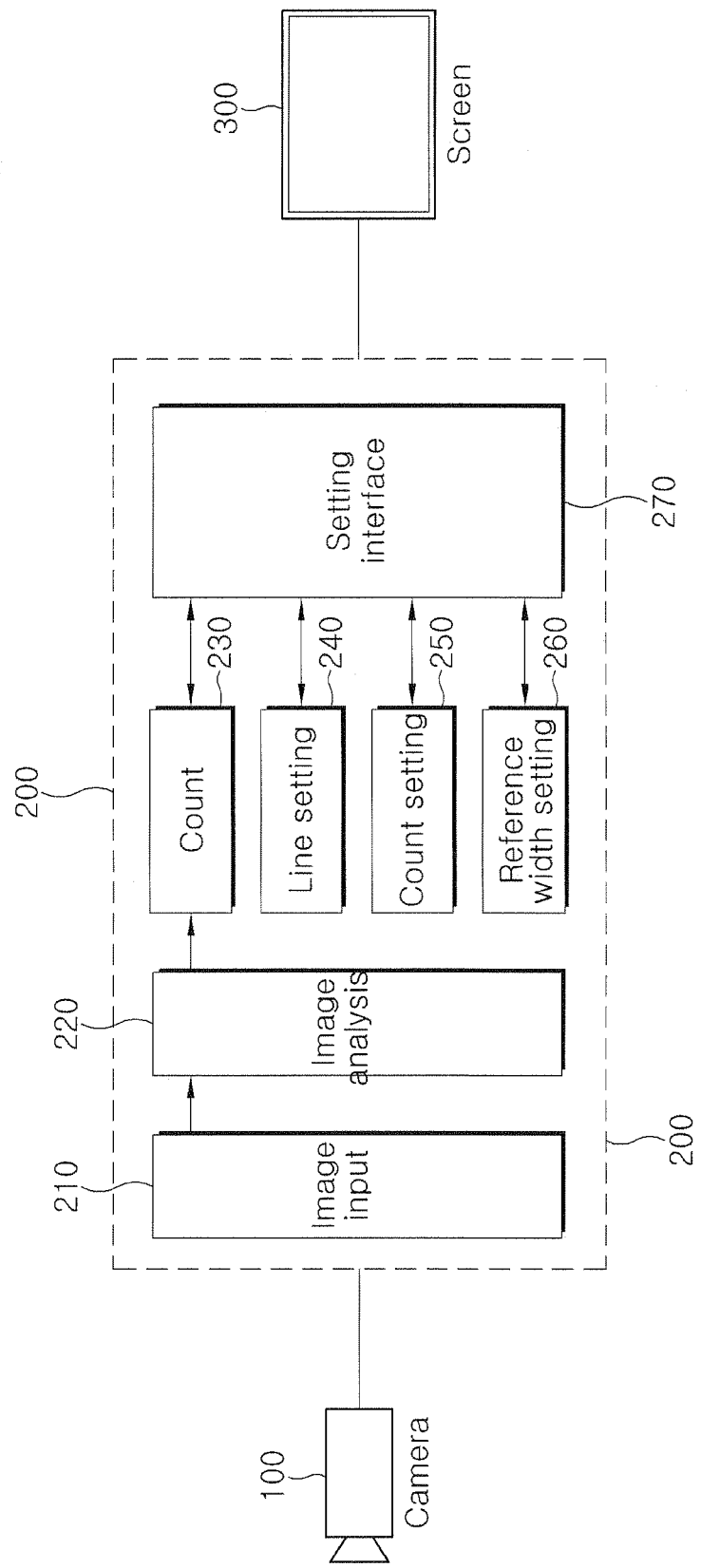
FIG. 11 is a view showing a configuration of the people counter including a setting interface according to an embodiment of the present invention.

FIG. 11 is a view showing a configuration of the people counter including the setting interface according to an embodiment of the present invention.

The people counter 200 includes an image input unit 210 which receives an image, which is displayed on a screen 300, from a camera, and an image analysis unit 220 which analyzes the image, and counts a moving object moving from region to region within the image. The people counter 200 further includes a setting interface 270 which allows a user to select one or more preset visible components for count of the moving object and superimpose the selected visible component on the image in a drag& drop manner using a point device in order to set and manipulate the visible component, a line setting unit 240 which provides a moving object crossing boundary line as one of the visible components, a reference width setting unit 260 which provides a reference width for indication of a reference of a width of the moving object crossing the line, as one of the visible components, and a count unit 230 which detects the width of the moving object crossing the line in the received image through a preset image analysis system and counts the moving object based on the reference width by means of a preset counting scheme.

It is preferable that the setting interface 270 indicates the width of the detected moving object accumulatively in count of the moving object in such a manner that a new detected content is indicated in a region adjacent to the reference width while already-detected contents are ousted and more than a preset number of already-detected contents disappear.

In addition, when the width of the detected moving object is indicated, the setting interface 270 may indicate a plurality of blanks to differentiate between widths of a plurality of detected moving objects depending on the number of moving objects determined when the plurality of moving objects is counted.

The reference width setting unit 260 provides a graphics user interface which displays the reference width located on the line and allows a user to make a real time manipulation for the reference width using the pointing device.

It is here preferable that the reference width setting unit 260 sets the reference width with two bars indicated in both directions on the line so that the user can use the pointing device to adjust the reference width symmetrically and simultaneously with respect to a middle point between the two bars.

The reference width setting unit 260 may provide a reference width consisting of a first reference width used to count one moving object, a second reference width which is set to be smaller than the first reference width and does not count the moving object, and a third reference width which is set to be larger than the first reference width and counts one or more moving objects, all of which are simultaneously adjusted according to a predetermined rule when the first reference width is adjusted.

In addition, if the width of the detected moving object is located to correspond to one of the first reference width, the second reference width and the third reference width, the setting interface 270 can indicate the width of the detected moving object at a position corresponding to the set reference width with one or more distinct colors according to a predetermined indication rule.

In addition, it is preferable that the setting interface 270 provides an interface which allows movement and adjustment of the reference width in a drag and drop manner.

The people counter may further include a count setting unit 250 which provides a counter, as one of the visible components, which is arranged in one region differentiated by the line and indicates count for a moving object moving between the one region and the other region.

It is here preferable that the count unit 230 performs a counting operation through an image analysis system to detect width of adjacent pixels which is changed within a predetermined range of the line.

The typical example of the pointing device is a mouse.

Figure 12:
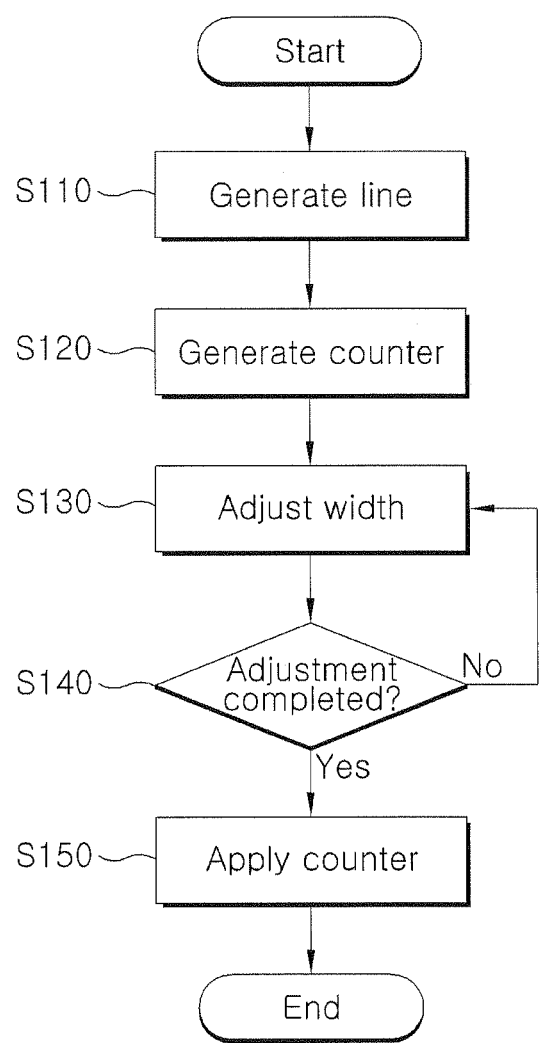
FIG. 12 is a flow chart for explaining a setting method of the people counter including the setting interface according to an embodiment of the present invention.

FIG. 12 is a flow chart for explaining a setting method of the people counter including the setting interface according to an embodiment of the present invention. The setting method of the people counter is to count a moving object moving between regions within an image received from a camera through image analysis. The setting method includes a step of providing a screen on which the image is displayed, a step of providing an interface which allows a user to select one or more preset visible components for count of the moving object and superimpose the selected visible component on the image in a drag& drop manner using a point device in order to set and manipulate the visible component, a step S110 of providing a moving object crossing boundary line as one of the visible components and displaying the provided line on the screen, a step 130 of providing a reference width for indication of a reference of a width of the moving object crossing the line, as one of the visible components, and a step 150 of detecting the width of the moving object crossing the line in the received image through a preset image analysis system and counting the moving object based on the reference width by means of a preset counting scheme.

The setting method of the people counter may further include a step S140 of indicating the width of the detected moving object accumulatively in count of the moving object in such a manner that a new detected content is indicated in a region adjacent to the reference width while already-detected contents are ousted and more than a preset number of already-detected contents disappear.

In addition, in the step S140, it is preferable to indicate a plurality of blanks to differentiate between widths of a plurality of detected moving objects depending on the number of moving objects determined when the plurality of moving objects is counted.

In the step S110, the people counter may indicate a reference width consisting of a first reference width used to count one moving object, a second reference width which is set to be smaller than the first reference width and does not count the moving object, and a third reference width which is set to be larger than the first reference width and counts one or more moving objects, all of which are simultaneously adjusted according to a predetermined rule when the first reference width is adjusted.

In the step S140, if the width of the detected moving object is located to correspond to one of the first reference width, the second reference width and the third reference width, it is preferable to indicate the width of the detected moving object at a position corresponding to the set reference width with one or more distinct colors according to a predetermined indication rule.

In the step S110, the people counter may set the reference width with two bars indicated in both directions on the line so that the user can use the pointing device to adjust the reference width symmetrically and simultaneously with respect to a middle point between the two bars.

In addition, it is preferable that the step of providing an interface provides an interface which allows movement and adjustment of the reference width using the pointing device in a drag and drop manner.

The setting method of the people counter may further include a step S120 of providing a counter, as one of the visible components, which is arranged in one region differentiated by the line and indicates count for a moving object moving between the one region and the other region.

While the present invention has been particularly shown and described with reference to exemplary embodiments thereof, it will be understood by those skilled in the art that various changes in form and details may be made therein without departing from the spirit and scope of the present invention as defined by the appended claims and equivalents thereof.

What is claimed is:

1. A people counter for counting a moving object moving from region to region within an image received from a camera through an image analysis system, comprising:
   a setting interface which provides a screen on which the image is displayed and allows a user to select one or more preset visible components for count of the moving object and superimpose the selected visible component on the image in a drag & drop manner using a point device in order to set and manipulate the visible component;
   a line setting unit which provides a moving object crossing boundary line as one of the visible components;
   a reference width setting unit which provides a reference width for indication of a reference of a width of the moving object crossing the line, as one of the visible components; and
   a count unit which detects the width of the moving object crossing the line in the received image through a preset image analysis system and counts the moving object based on the reference width by means of a preset counting scheme,
   wherein the reference width setting unit provides a graphics user interface which displays the reference width located on the line and allows a user to make a real time manipulation for the reference width using the pointing device,
   the reference width setting unit sets the reference width with two bars indicated in both directions on the line so that the user can use the pointing device to adjust the reference width symmetrically and simultaneously with respect to a middle point between the two bars, and
   the reference width setting unit provides a reference width consisting of a first reference width used to count one moving object, a second reference width which is set to be smaller than the first reference width and does not count the moving object, and a third reference width which is set to be larger than the first reference width and counts one or more moving objects, all of which are simultaneously adjusted according to a predetermined rule when the first reference width is adjusted.

2. The people counter according to claim 1, wherein the setting interface indicates the width of the detected moving object accumulatively in count of the moving object in such a manner that a new detected content is indicated in a region adjacent to the reference width while already-detected contents are ousted and more than a preset number of already-detected contents disappear.

3. The people counter according to claim 2, wherein, when the width of the detected moving object is indicated, the setting interface indicates a plurality of blanks to differentiate between widths of a plurality of detected moving objects depending on the number of moving objects determined when the plurality of moving objects is counted.

4. The people counter according to claim 1, wherein, if the width of the detected moving object is located to correspond to one of the first reference width, the second reference width and the third reference width, the setting interface indicates the width of the detected moving object at a position corresponding to the set reference width with one or more distinct colors according to a predetermined indication rule.

5. The people counter according to claim 1, wherein the setting interface provides an interface which allows movement and adjustment of the reference width in a drag and drop manner.

6. The people counter according to claim 1, further comprising a count setting unit (250) which provides a counter, as one of the visible components, which is arranged in one region differentiated by the line and indicates count for a moving object moving between the one region and other region.

7. The people counter according to claim 1, wherein the count unit performs a counting operation through an image analysis system to detect width of adjacent pixels which is changed within a predetermined range of the line.

8. The people counter according to claim 1, wherein the pointing device is a mouse.

9. A setting method of a people counter for counting a moving object moving from region to region within an image received from a camera through an image analysis system, comprising the steps of:
   a) providing a screen on which the image is displayed;
   b) providing an interface which allows a user to select one or more preset visible components for count of the moving object and superimpose the selected visible component on the image in a drag & drop manner using a point device in order to set and manipulate the visible component;
   c) providing a moving object crossing boundary line as one of the visible components and displaying the provided line on the screen;
   d) providing a reference width for indication of a reference of a width of the moving object crossing the line, as one of the visible components,
   e) detecting the width of the moving object crossing the line in the received image through a preset image analysis system and counting the moving object based on the reference width by means of a preset counting scheme; and
   f) indicating the width of the detected moving object accumulatively in count of the moving object in such a manner that a new detected content is indicated in a region adjacent to the reference width while already-detected contents are ousted and more than a preset number of already-detected contents disappear, wherein the step f) includes indicating a reference width consisting of a first reference width used to count one moving object, a second reference width which is set to be smaller than the first reference width and does not count the moving object, and a third reference width which is set to be larger than the first reference width and counts one or more moving objects, all of which are simultaneously adjusted according to a predetermined rule when the first reference width is adjusted.

10. The setting method according to claim 9, wherein the step f) includes indicating a plurality of blanks to differentiate between widths of a plurality of detected moving objects depending on the number of moving objects determined when the plurality of moving objects is counted.

11. The setting method according to claim 9, wherein the step f) includes, if the width of the detected moving object is located to correspond to one of the first reference width, the second reference width and the third reference width, indicating the width of the detected moving object at a position corresponding to the set reference width with one or more distinct colors according to a predetermined indication rule.

12. The setting method according to claim 9, wherein the step d) include setting the reference width with two bars indicated in both directions on the line so that the user can use the pointing device to adjust the reference width symmetrically and simultaneously with respect to a middle point between the two bars.

13. The setting method according to claim 9, wherein the step b) includes providing an interface which allows movement and adjustment of the reference width using the pointing device in a drag and drop manner.

14. The setting method according to claim 9, further comprising a step of g) providing a counter, as one of the visible components, which is arranged in one region differentiated by the line and indicates count for a moving object moving between the one region and other region, and displaying the counter on the screen.

* * * * *